(12) United States Patent
Nagashima et al.

(10) Patent No.: US 7,390,100 B2
(45) Date of Patent: Jun. 24, 2008

(54) VARIABLE-SHAPE MIRROR AND OPTICAL PICKUP DEVICE THEREWITH

(75) Inventors: Kenji Nagashima, Osaka (JP); Hitoshi Fujii, Osaka (JP); Fuminori Tanaka, Osaka (JP); Susumu Sugiyama, Shiga (JP); Akira Ishii, Shiga (JP); Katsuhiko Tanaka, Shiga (JP); Wataru Kuze, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 51 days.

(21) Appl. No.: 11/455,940

(22) Filed: Jun. 20, 2006

(65) Prior Publication Data

US 2007/0002472 A1 Jan. 4, 2007

(30) Foreign Application Priority Data

Jun. 20, 2005 (JP) .............................. 2005-179447

(51) Int. Cl.
*G02B 5/08* (2006.01)
(52) U.S. Cl. ........................................ 359/846; 359/226
(58) Field of Classification Search ......... 359/223–226, 359/871
See application file for complete search history.

(56) References Cited

U.S. PATENT DOCUMENTS 6,049,407 A * 4/2000 Melville .................... 359/223

FOREIGN PATENT DOCUMENTS

| JP | A-05-333274 | 12/1993 |
| JP | A-2004-70004 | 3/2004 |

* cited by examiner

*Primary Examiner*—Euncha P Cherry
(74) *Attorney, Agent, or Firm*—Morgan, Lewis & Bockius LLP

(57) ABSTRACT

A variable-shape mirror is provided with: a support base; a mirror portion that is disposed to face the support base and that has, on a side thereof facing away from the support base, a mirror surface which is irradiated with a light beam; fixed portions that fix the mirror portion to the support base; and piezoelectric elements that are sandwiched between the support base and the mirror portion and that vary a shape of the mirror surface. Here, the piezoelectric elements are arranged closer to a center of the mirror portion than the fixed portions are.

19 Claims, 6 Drawing Sheets

VARIABLE-SHAPE MIRROR AND OPTICAL PICKUP DEVICE THEREWITH

This application is based on Japanese Patent Application No. 2005-179447 filed on Jun. 20, 2005, the contents of which are hereby incorporated by reference.

BACKGROUND OF THE INVENTION

1. Field of the Invention

The present invention relates to a variable-shape mirror that permits the shape of a mirror surface thereof to be varied, and more particularly relates to the structure thereof. The present invention also relates to an optical pickup device provided with such a variable-shape mirror.

2. Description of Related Art

When information is read from or written to an optical disc such as a CD (compact disc) or DVD (digital versatile disc) by the use of an optical pickup device, the relationship between the optical axis of the optical pickup device and the disc surface should ideally be perpendicular. In reality, however, when the disc is rotating, their relationship does not always remain perpendicular. As a result, with an optical disc such as a CD or DVD, when its disc surface becomes inclined relative to the optical axis, the optical path of laser light is so bent as to produce coma aberration.

When coma aberration is produced, the spot of laser light shone on the optical disc deviates from the proper position, and, when the coma aberration becomes larger than permitted, inconveniently, it becomes impossible to accurately write or read information. For this reason, there have conventionally been proposed methods for correcting coma aberration as described above and other aberrations by the use of a variable-shape mirror.

For example, JP-A-2004-070004 proposes a method of reducing wavefront aberrations in a variable-shape mirror employing piezoelectric elements and having a unimorph or bimorph structure. The variable-shape mirror here has, for example, a structure as shown in FIGS. 7A and 7B. FIG. 7A shows the variable-shape mirror with the mirror fitting member 108 thereof removed, as seen from the side opposite to the mirror material 101 thereof. FIG. 7B is a sectional view as cut along line A-A shown in FIG. 7A. The variable-shape mirror comprises piezoelectric elements 102, wiring electrodes 103, individual electrodes 104, a mirror base 105, fixed portions 106, and slits 107.

According to JP-A-2004-070004, when, with the wiring electrodes 103 grounded, a positive voltage is applied to one of the individual electrodes 104 and a negative voltage to the other, one of the piezoelectric element 102 expands and the other contracts. Thus, the mirror surface becomes convex in the part thereof located on one side of the center thereof in the A-A direction and concave in the part thereof located on the other side. It is described that using this variable-shape mirror in an optical pickup device helps reduce wavefront aberrations.

However, JP-A-2004-070004 reports that, in a variable-shape mirror having such a structure, deformation is produced in such locations as the slits 107 arranged on the surface of the mirror material 101 when the shape of the mirror surface is varied. To correct this, JP-A-2004-070004 proposes a variable-shape mirror provided with an elastic structure arranged in the vicinity of where the deformation is produced to thereby reduce the deformation of the mirror surface and enhance the variation efficiency of the mirror surface.

Among other conventional variable-shape mirrors, as shown in JP-A-H05-333274, there is a method of performing phase control by varying the shape of the mirror itself by the use of a plurality of actuators.

However, when, for example, a mirror surface of a variable-shape mirror is varied by sandwiching a piezoelectric element between a support base and a mirror portion and by exploiting a lateral displacement of the piezoelectric element placed on the support base, it has been found that deformation is produced, as shown by arrows in FIG. 8, on the mirror surface of the mirror portion on a side opposite to a side where the piezoelectric element and the mirror portion made contact with each other when the piezoelectric element is driven. FIG. 8 shows results of a computer simulation obtained through a finite-element method that is a common technique used as an approximation analysis technique for analyzing deformation or stress of a structure.

In other words, for example, as long as the shape of the mirror is varied by the contraction of the piezoelectric element as is the case with JP-A-2004-070004 or JP-A-H05-333274, local deformation is inevitably produced on the mirror surface at a location where the piezoelectric element is arranged. For this reason, if a variable-shape mirror structured as described in JP-A-2004-070004 or JP-A-H05-333274 is provided in an optical pickup device, local deformation is produced on the mirror surface. Consequently, it may not be possible to properly correct aberrations.

SUMMARY OF THE INVENTION

In view of the conventionally encountered inconveniences discussed above, it is an object of the present invention to provide a variable-shape mirror that can vary the shape of the mirror surface thereof and can properly correct aberrations without being affected by deformation developed on the mirror surface. It is another object of the present invention is to provide a variable-shape mirror that offers a sufficiently wide mirror shape variation range. It is still another object of the present invention to provide an optical pickup device that is provided with a variable-shape mirror that is not affected by deformation on the mirror surface and that can thus properly correct aberrations in a wide range.

To achieve the above objects, according to one aspect of the present invention, a variable-shape mirror is provided with: a support base; a mirror portion that is disposed to face the support base and that has, on a side thereof facing away from the support base, a mirror surface which is irradiated with a light beam; fixed portions that fix the mirror portion to the support base; and piezoelectric elements that are sandwiched between the support base and the mirror portion and that vary a shape of the mirror surface. Here, the piezoelectric elements are arranged closer to a center of the mirror portion than the fixed portions are. It is to be noted that, in a case where electrode portions connected to the piezoelectric elements are provided on a side of the mirror portion opposite to the mirror surface side, the mirror portion includes the electrode portions, and this applies also to descriptions hereinafter.

With this structure, since the mirror portion and the fixed portion are fixed together, it becomes possible to vary the shape of the mirror surface uniformly with a small amount of displacement of the piezoelectric elements that are arranged closer to the center of the mirror portion than the fixed portions are. This helps properly correct aberrations.

In addition, since the fixed portions are bonded to the mirror portion at an edge thereof, it becomes possible to increase the shape variation of the mirror surface with a small amount of displacement of the piezoelectric elements.

Furthermore, since the piezoelectric elements are arranged outside an area within which the mirror surface is irradiated with the light beam, it becomes possible to vary the shape of the mirror surface uniformly without producing deformation thereon.

Since the piezoelectric elements are arranged close to the fixed portions, it becomes possible to further increase the shape variation of the mirror surface with expansion and contraction of the piezoelectric elements.

Since individual pairs of the fixed portions and the piezoelectric elements are arranged symmetrically in cross-shaped directions, it becomes possible to vary the shape of the mirror surface more uniformly and correct aberrations more properly.

The optical pickup device according to the present invention is provided with the variable-shape mirror structured as described above. This makes it possible to prevent the mirror surface from deformation that is otherwise developed when the piezoelectric elements are driven to vary the shape of the mirror, and, thereby, to surely correct aberrations. Furthermore, with an increased amount of shape variation in the mirror portion of the variable-shape mirror, it is also possible to achieve a wide degree of aberration correction.

DETAILED DESCRIPTION OF PREFERRED EMBODIMENTS

Figure 1A:
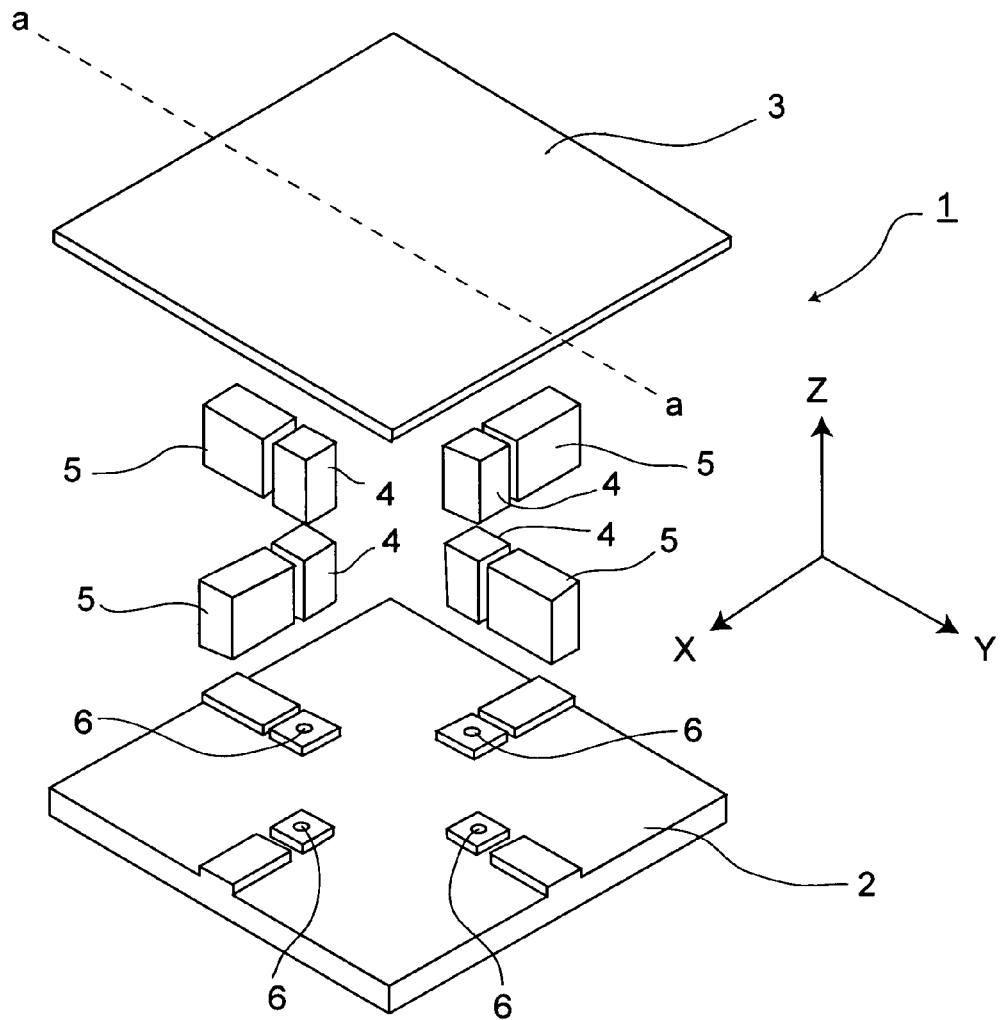
FIG. 1A is an exploded perspective view showing components constituting a variable-shape mirror embodying the present invention.

Hereinafter, embodiments of the present invention will be described with reference to the accompanying drawings. It should be understood that the embodiments described below are merely examples, and are therefore not meant to limit in any way the manner in which the present invention can be carried. It should also be understood that, in the drawings, the sizes and thicknesses of the components, the amount of displacement that takes place when the shape is varied, etc. are exaggerated for the purpose of easy understanding, and therefore these dimensions are different from those actually observed.

Figure 1B:
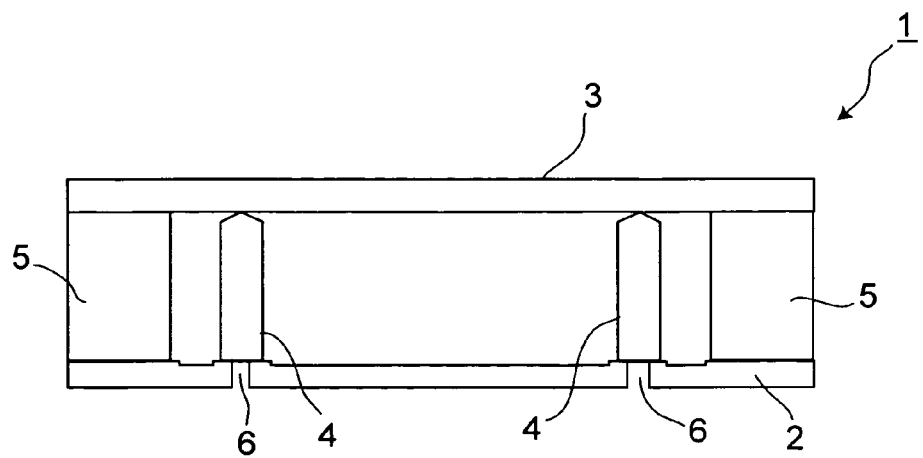
FIG. 1B is a sectional view as cut along line a-a shown in FIG. 1A.

FIG. 1A is an exploded perspective view showing components constituting a variable-shape mirror embodying the invention. FIG. 1B is a sectional view as cut along line a-a shown in FIG. 1A, showing a state in which all of the components are put together.

A variable-shape mirror 1 according to the present invention is built as an abberation correcting mirror that varies the shape of the mirror surface formed on the top side of a mirror portion 3 by exploiting the vertical displacement of piezoelectric elements 4. The piezoelectric elements 4 and fixed portions 5 are fitted to a support base 2. The support base 2 is formed of, for example, an insulating material such as glass or ceramic. The support base 2 has electrode holes 6 formed therein through which a voltage is fed to the piezoelectric elements 4.

The shape of the mirror surface of the mirror portion 3 is varied by the piezoelectric elements 4, and the mirror portion 3 reflects a light beam emitted from a light source. The mirror portion 3 is formed of, preferably, a material that is rigid and that is electrically conductive so as to be able to feed a voltage to the piezoelectric elements 4. Examples of such a material include silicon and metals such as aluminum and iron. The mirror portion 3 may be formed of an insulating material such as glass, though it then does not offer electrical conductivity. In a case where the mirror portion 3 is formed of an insulating material such as glass, to achieve electrical conduction to the piezoelectric elements 4, it is necessary to form, on the side of the mirror portion 3 opposite to the mirror surface thereof, an electrode pattern by vapor-depositing gold or the like, or to fit an electrode to the side of the mirror portion 3 opposite to the mirror surface thereof.

The mirror portion 3 may be formed of a single material. Alternatively, it is also possible to form a base portion of the mirror portion 3 with silicon and then coat the top side thereof by laying a coating of aluminum or the like to form a mirror surface. It is also possible to form a plurality of layers on the base portion.

Figure 2A:
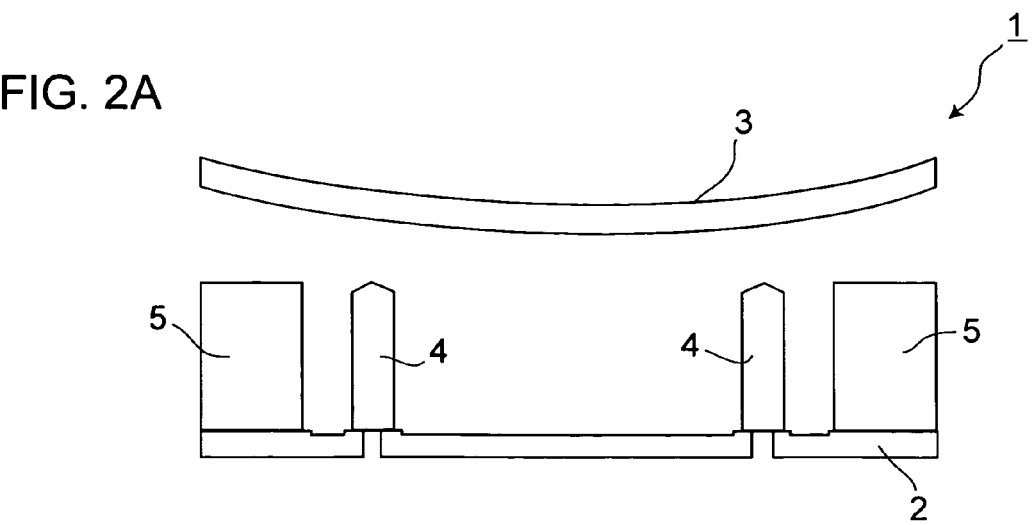
FIG. 2A is a sectional view schematically showing a modified example of the variable-shape mirror having the mirror portion thereof formed concave.
Figure 2B:
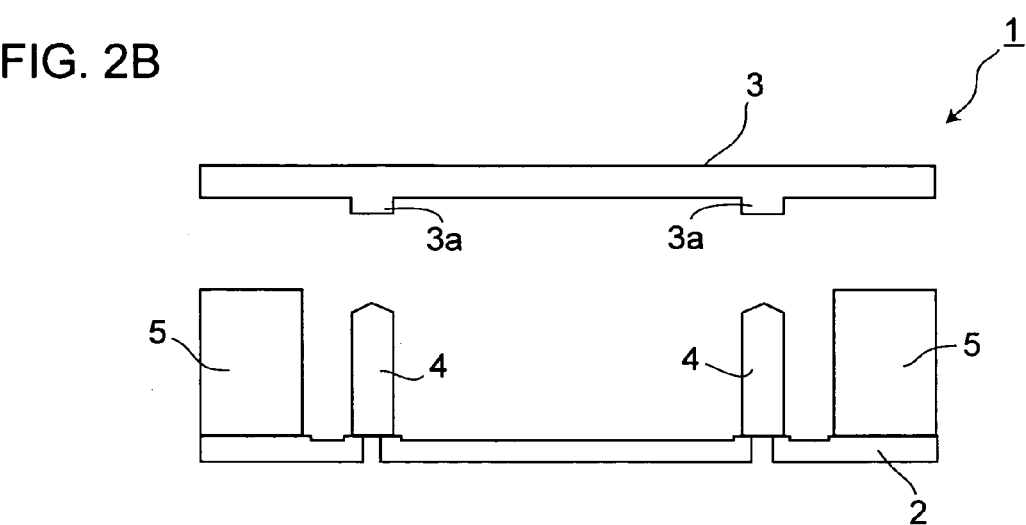
FIG. 2B is a sectional view schematically showing another modified example of the variable-shape mirror having a projection formed in a part thereof where the side opposite to the side of the mirror surface of the mirror portion makes contact with the piezoelectric elements.

In this embodiment, the mirror portion 3 is flat-plate shaped. Alternatively, the mirror portion 3 may be given any other shapes or otherwise modified within the objects of the present invention. For example, as shown in FIG. 2A, the mirror surface portion of the mirror portion 3 may be concaved and, thereby, the mirror portion 3 may be formed in a concave shape as a whole. It is also possible, as shown in FIG. 2B, to form a projection 3*a* on the side of the mirror portion 3 opposite to the mirror surface in parts thereof where the mirror portion 3 makes contact with the piezoelectric elements 4. Here, FIGS. 2A and 2B show a state before the mirror portion 3 and the fixed portions 5 are bonded together so that the shape of the mirror portion 3 can be easily understood.

The concave-surfaced mirror portion 3 is formed, for example, by laying together materials having different thermal contraction coefficients. For example, in a case where the mirror portion 3 is formed of silicon, the projections 3a are formed by dry etching.

As shown in FIGS. 1A and 1B, the fixed portions 5 are sandwiched between the support base 2 and the mirror portion 3, and are disposed outside the piezoelectric elements 4 in a plan view. Furthermore, the fixed portions 5 are, at the top faces thereof, bonded to the mirror portion 3. In this embodiment, the fixed portions 5 are separated from the support base 2; alternatively, the support base 2 and the fixed portions 5 may be formed integrally, or may be given any other shapes or otherwise modified within the objects of the present invention. It is preferable that the heights of the individual fixed portions 5 be made equal to prevent deformation on the mirror surface of the mirror portion 3, and it is also preferable that the relationship between the heights of the fixed portions 5 and the piezoelectric elements 4 be so adjusted as not to produce deformation.

As shown in FIGS. 1A and 1B, the piezoelectric elements 4 are sandwiched between the support base 2 and the mirror portion 3. Moreover, for example, as shown in FIG. 1B, the piezoelectric elements 4 are connected to individual electrodes (unillustrated) through the electrode holes 6 formed at the side facing the bottom faces of the piezoelectric elements 4. The top faces of the piezoelectric elements 4 make contact with the mirror portion 3, which also serves as a common electrode, and this permits the piezoelectric elements 4 to expand and contract. In a case where, as described above, the mirror portion 3 is formed of an insulating material, an electrode layer is vapor-deposited on the side thereof opposite to the mirror surface to provide an electrode on the mirror portion 3, and this electrode is used as a common electrode.

The piezoelectric elements 4 and the mirror portion 3 may or may not be bonded together. In a case where they are not bonded together and the mirror portion 3 is flat-shaped as in this embodiment, when the piezoelectric elements 4 contract, the piezoelectric elements 4 and the mirror portion 3 are brought into a non-contact state, thereby breaking the electrical conduction to the piezoelectric elements 4. This does not permit the piezoelectric elements 4 to contract further. For this reason, the variation range of the mirror surface of the mirror portion 3 becomes smaller. In this case, it is possible to use the mirror portion 3 having an overall concaved shape by concaving the mirror surface portion thereof as shown in FIG. 2A or the mirror portion 3 having the projections on the side thereof opposite to the mirror surface in parts thereof where the mirror portion 3 makes contact with the piezoelectric elements 4 as shown in FIG. 2B. With this mirror portion 3, the electrical conduction to the piezoelectric elements 4 can be maintained when the piezoelectric elements 4 contract. As a result, it becomes possible to vary the shape of the mirror portion 3 by contracting the piezoelectric elements 4, thereby preventing the variation range of the mirror portion 3 from reducing.

The piezoelectric elements 4 are formed of a piezoelectric ceramic such as PZT (lead zirconate titanate, $Pb(Zr_xTi_{1-x})O_3$) or a piezoelectric polymer such as polyvinylidene fluoride. Among these, a piezoelectric ceramic material is preferable for its high mechanical strength.

In this embodiment, the piezoelectric elements 4 are rectangular-column-shaped formed finer at the top ends thereof that make contact with the mirror portion 3; these, however, may be given any other shape, for example, a rectangular parallelepiped shape or a circular-columnar shape at the top ends.

Next, how the piezoelectric elements 4 are arranged in the variable-shape mirror 1 will be described. In this embodiment, as shown in FIG. 1A, it is preferable that a plurality of piezoelectric elements 4 be arranged symmetrically. However, to vary the shape of the mirror surface of the mirror portion 3 uniformly at different positions, it is more preferable that four piezoelectric elements 4 be arranged symmetrically in cross-shaped directions in a plan view. The fixed portions 5 are arranged individually adjacent to the individual piezoelectric elements 4 on a line connecting the symmetrically arranged piezoelectric elements 4. To more properly vary the shape of the mirror surface, it is more preferable that the piezoelectric elements 4 be arranged symmetrically about an axis passing through the center of the mirror surface of the mirror portion 3. In addition, the piezoelectric elements 4 are also arranged by taking into consideration the relationship with a light beam emitted to the variable-shape mirror 1.

Figure 3:
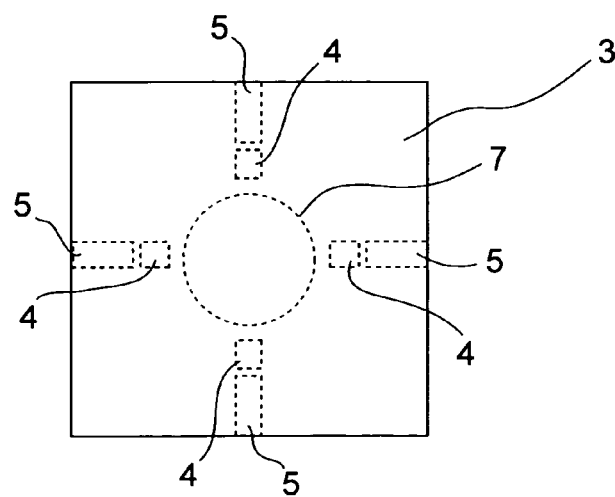
FIG. 3 is a plan view showing the variable-shape mirror as seen from the side of the mirror surface of the mirror portion.
Figure 8:
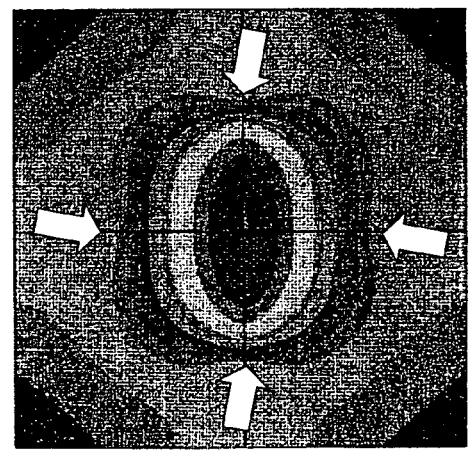
FIG. 8 is a diagram for showing how deformation is produced on a mirror surface of the conventional variable-shape mirror as piezoelectric elements thereof are driven.

FIG. 3 is a plan view showing the variable-shape mirror 1 as seen from the side of the mirror surface of the mirror portion 3. In FIG. 3, an inside area of a circular portion shown in a center portion of the mirror portion 3 is an irradiation area 7 within which the mirror surface of the mirror portion 3 is irradiated with a light beam. The piezoelectric elements 4 and the fixed portions 5 are positioned outside this irradiation area 7 on the side opposite to the mirror surface. As described previously with reference to FIG. 8, deformation is developed on the mirror surface at locations and on the side opposite to where the piezoelectric elements 4 contact with the mirror portion 3, when the piezoelectric elements 4 expand or contract. However, when the piezoelectric elements 4 are arranged according to the embodiment, the light beam is not affected by the deformation that develops on the mirror surface when the piezoelectric elements 4 expand or contract. This makes it possible to perform a proper correction when aberrations are corrected, because it is not affected by the deformation developed on the mirror surface.

The irradiation area 7 of the light beam is defined by an effective diameter of the light beam that enters the variable-shape mirror 1. For example, in an optical pickup device that performs such operation as reading information from an optical disk, the numerical aperture varies depending on the types of discs such as a CD or DVD. Therefore, when the laser beam emitted from a semiconductor laser enters the variable-shape mirror 1, the effective diameter does not always remains constant and, thereby, the irradiation area of the light beam varies. For this reason, it is necessary to arrange the piezoelectric elements 4 in view of this fact during the design process.

Figure 4A:
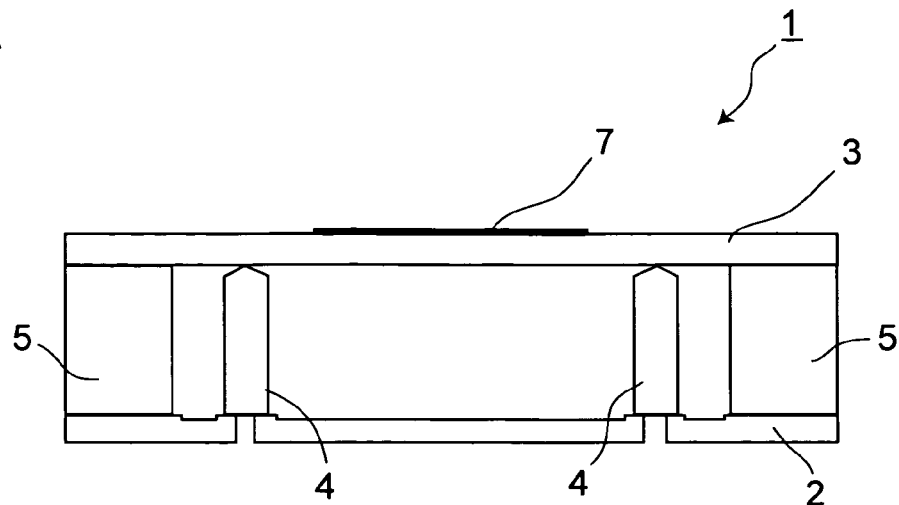
FIG. 4A is a sectional view schematically explaining a state in which no voltage is applied to the piezoelectric elements of the variable-shape mirror.
Figure 4B:
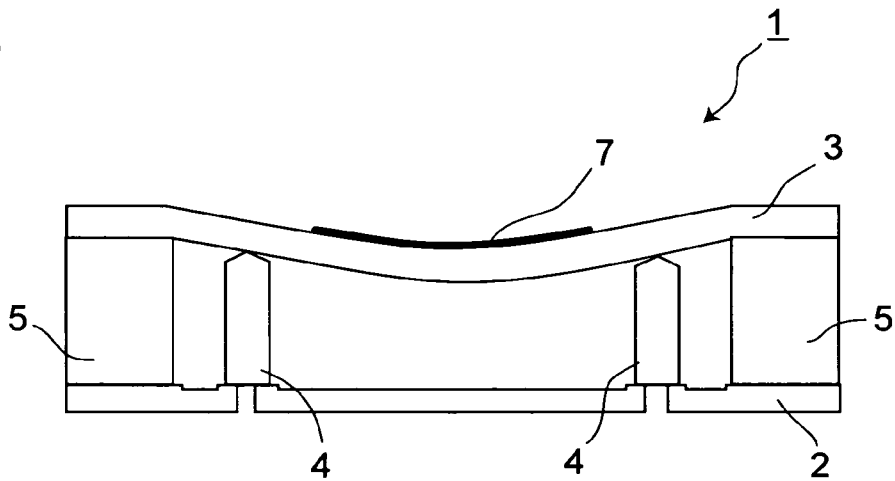
FIG. 4B is a sectional view schematically explaining a state in which a voltage is applied to the piezoelectric elements of the variable-shape mirror and thereby the piezoelectric elements contract.
Figure 4C:
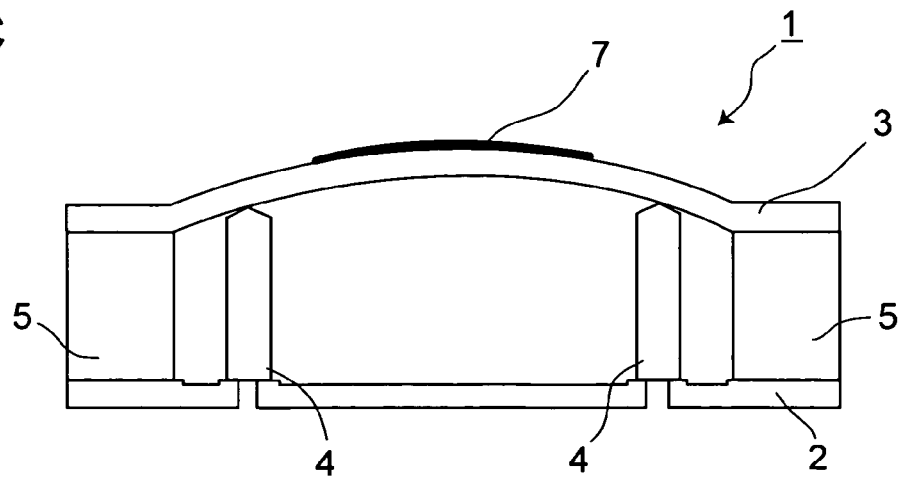
FIG. 4C is a sectional view schematically explaining a state in which a voltage is applied to the piezoelectric elements of the variable-shape mirror and thereby the piezoelectric elements expand.

Now, the operation of the variable-shape mirror 1 structured as described above will be described with reference to FIGS. 4A, 4B, and 4C. For example, as the piezoelectric elements 4 are driven, the variable-shape mirror 1 varies the shape thereof as shown in FIGS. 4A to 4C. FIGS. 4A to 4C are sectional views of the variable-shape mirror 1 as cut along line a-a shown in FIG. 1A.

FIG. 4A shows a state in which no voltage is applied to the piezoelectric elements 4. When a voltage is applied to the piezoelectric elements 4, they expand or contract. When the left-hand and right-hand piezoelectric elements 4 contract, as shown in FIG. 4B, the mirror portion 3 becomes concave. When the left-hand and right-hand piezoelectric elements 4 expand, as shown in FIG. 4C, the mirror portion 3 becomes convex. How the individual piezoelectric elements 4 expand or contract may be combined in any way other than specifically described here. For example, in FIGS. 4A to 4C, one of the left-side and right-side piezoelectric elements 4 may be made to expand while the other is made to contract. In either of the cases in which the piezoelectric elements 4 expand and contract, since the piezoelectric elements 4 are arranged outside the irradiation area 7 which is irradiated with a light beam, deformation does not develop on the mirror surface of the mirror portion 3 within the irradiation area 7 of the light beam.

Figure 5A:
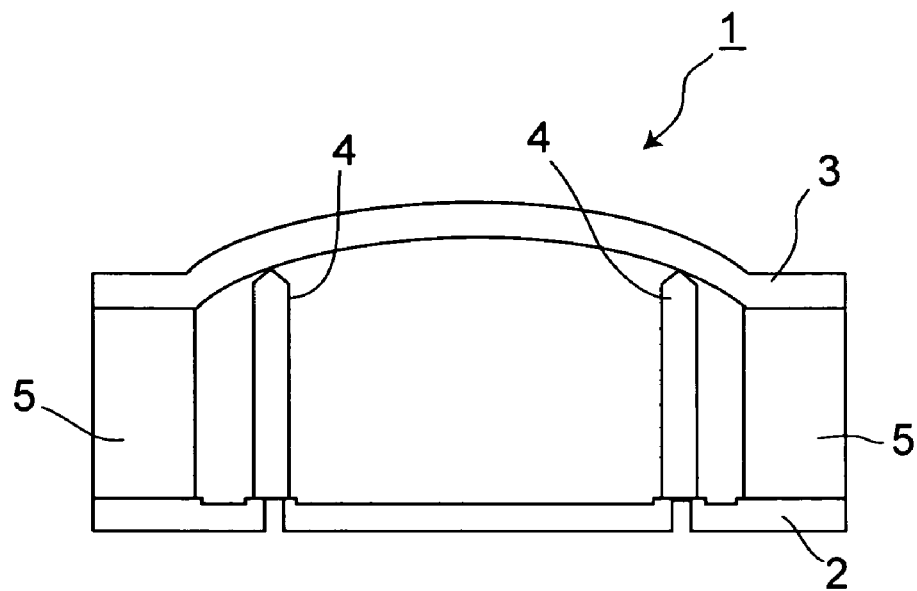
FIG. 5A is a sectional view schematically explaining a relationship between how the piezoelectric elements and the fixed portions of the variable-shape mirror are positioned and how much the mirror portion varies.
Figure 5B:
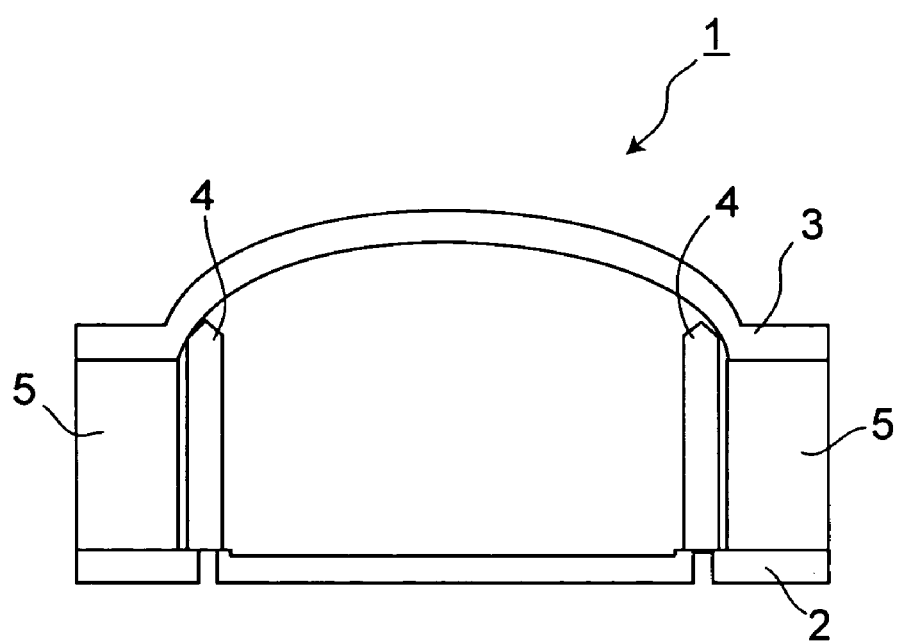
FIG. 5B is a sectional view schematically explaining a relationship between how the piezoelectric elements and the fixed portions of the variable-shape mirror are positioned and how much the mirror portion varies, wherein the piezoelectric elements are positioned closer to the fixed portions.

As shown in FIG. 5A, the piezoelectric elements 4 are not necessarily be arranged close to the fixed portions 5. However, as shown in FIG. 5B, it is preferable that the piezoelectric elements 4 and the fixed portions 5 be arranged close to each other. When the piezoelectric elements 4 and the fixed portions 5 are arranged close to each other, the distance between a point through which the mirror surface of the mirror portion 3 is subjected to the action when the piezoelectric elements 4 are driven and the center of the mirror portion 3 increases. This, as shown in FIG. 5B, helps increase the amount of shape variation of the mirror surface of the mirror portion 3. Here, FIGS. 5A and 5B are sectional views of the variable-shape mirror 1 as cut along line a-a shown in FIG. 1A.

According to the embodiment, it is preferable that the fixed portions 5 to which the piezoelectric elements 4 are arranged close be fixed to the mirror portion 3 in outer peripheral parts thereof. It is further preferable that the fixed portions 5 be fixed to the mirror portion 3 at the edge thereof. This helps increase the distance between a point through which the mirror surface of the mirror portion 3 is subjected to the action when the piezoelectric elements 4 are driven and the center of the mirror portion 3. This makes it possible to further increase the amount of the shape variation of the mirror surface.

There may be provided any number of piezoelectric elements 4 in any arrangement other than specifically described in this embodiment. However, to vary the shape of the mirror surface of the mirror portion 3 uniformly at different positions, it is preferable that a plurality of piezoelectric elements 4 be provided symmetrically in a plan view; when the size of the mirror portion 3 and other factors are taken into consideration, it is more preferable that four piezoelectric elements 4 be arranged symmetrically in cross-shaped directions. It is still more preferable that the piezoelectric elements 4 be arranged symmetrically about an axis passing through the center of the mirror surface of the mirror portion 3 as seen in a plan view. In a case where a plurality of piezoelectric elements 4 are provided, it is preferable to adjust the heights of the piezoelectric elements 4 individually so as to prevent deformation from developing on the mirror surface of the mirror portion 3.

In the embodiments described above, as shown in FIG. 1A, the variable-shape mirror 1 as a whole is given the shape of a rectangular parallelepiped; its shape, however, is not limited to this particular shape, but may be modified within the objects of the present invention. For example, the support base 2, the mirror portion 3, or any other components may be formed circular, and the support base 2 may be formed larger than the mirror portion 3.

Figure 6:
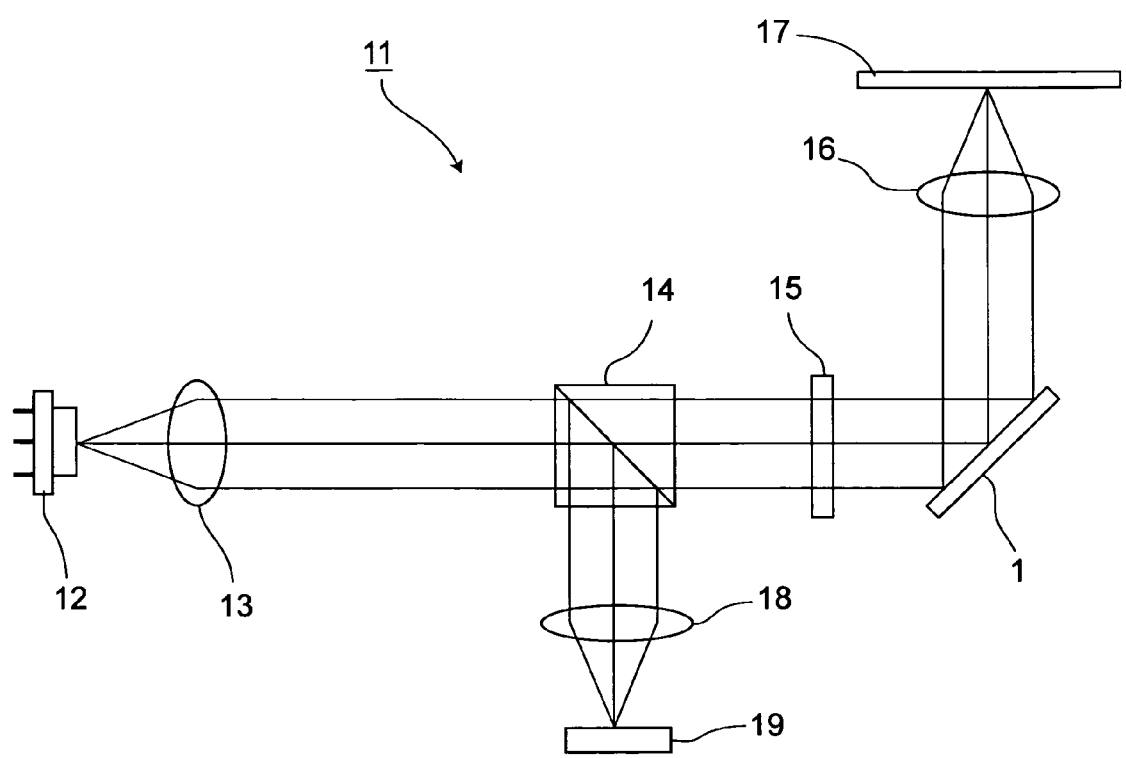
FIG. 6 is a diagram showing an outline of the optical system of an optical pickup device employing a variable-shape mirror embodying the present invention.
Figure 7A:
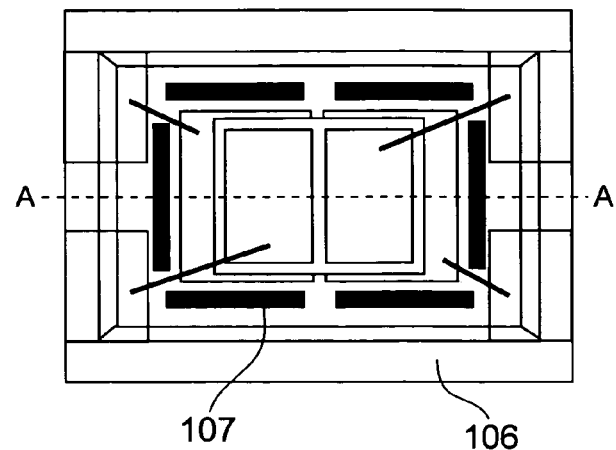
FIG. 7A is a diagram showing the structure of a conventional variable-shape mirror.
Figure 7B:
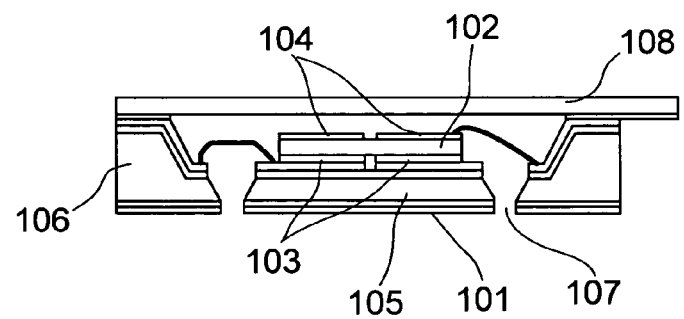
FIG. 7B is a sectional view of the conventional variable-shape mirror as cut along line A-A shown in FIG. 7A.

Next, as another embodiment of the present invention, an optical pickup device 11 employing a variable-shape mirror according to the present invention will be described. The optical pickup device 11 incorporating the variable-shape mirror 1 according to the present invention includes an optical system constructed, for example, as shown in FIG. 6. The optical system of the optical pickup device 11 may be constructed in any other manner within the objects of the present invention.

The optical pickup device 11 shown in FIG. 6 is provided with a semiconductor laser 12, a collimator lens 13, a beam splitter 14, a variable-shape mirror 1 according to the present invention, a quarter-wave plate 15, an objective lens 16, a condenser lens 18, and a photodetector 19.

The laser light emitted from the semiconductor laser 12 is converted into a parallel beam by the collimator lens 13. This parallel beam is transmitted through the beam splitter 14, then has its polarization state changed by the quarter-wave plate 15, is then reflected on the variable-shape mirror 1, and is then condensed by the objective lens 16 to be focused on an optical disc 17. The laser light reflected from the optical disc 17 passes through the objective lens 16, is then reflected on the variable-shape mirror 1, then passes through the quarter-wave plate 15, is then reflected by the beam splitter 14, and is then condensed by the condenser lens 18 to be directed to the photodetector 19.

In this embodiment, the variable-shape mirror 1 functions, on one hand, as a conventionally used raising mirror. On the other hand, in this optical system, for example, when the optical disc 17 becomes inclined relative to the optical axis of the laser light, as described earlier, coma aberration is produced. To correct this coma aberration, the shape of the mirror surface of the variable-shape mirror 1 is varied; that is, the variable-shape mirror 1 also serves to correct aberrations. Specifically, based on the signal obtained from the photodetector 19, when correction of wavefront aberrations such as coma aberration is necessary, a controller (unillustrated) provided in the optical pickup device 11 feeds a signal to the variable-shape mirror 1 to instruct it to vary the shape of the mirror surface of the mirror portion 3 so as to correct the aberrations. According to the present invention, when shape of the mirror surface of the mirror portion 3 is varied, only a portion thereof not having deformation is used for correcting aberrations. This makes it possible to perform a proper correction for aberrations.

According to the present invention, in a variable-shape mirror that varies the shape of the mirror surface thereof is ingeniously structured such that it makes it possible to reflect s light beam without being affected by the deformation developed when the piezoelectric elements are driven.

Furthermore, the variable-shape mirror is ingeniously structured so that it offers an increased amount of shape variation in the mirror portion.

With an optical pickup device employing a variable-shape mirror according to the present invention, it is possible to prevent the mirror surface of the variable-shape mirror from deformation that is developed when the piezoelectric elements incorporated therein are driven, and, thereby, to surely correct aberrations. Furthermore, with an increased amount of shape variation in the mirror surface of the variable-shape mirror, it is also possible to achieve a given degree of aberration correction.

What is claimed is:
1. A variable-shape mirror comprising:
   a support base;
   a mirror portion that is disposed to face the support base and that has, on a side thereof facing away from the support base, a mirror surface which is irradiated with a light beam;
   piezoelectric elements that are sandwiched between and within the support base and the mirror portion so as to make contact with both of the support base and the mirror portion, that vary a shape of the mirror surface, and that are disposed independently from each other; and fixed portions that are sandwiched between and within the support base and the mirror portion so as to make contact with both of the support base and the mirror portion, that fix the mirror portion to the support base, that are provided in a same number as the piezoelectric elements, and that are disposed independently from each other, wherein each of the piezoelectric elements is arranged closer to a center of the mirror portion than each of the fixed portions that are disposed independently from each other is arranged, and said each of the piezoelectric elements makes a pair with a fixed portion that is disposed closest thereto among said fixed portions.

2. The variable-shape mirror of claim 1,
wherein the fixed portions are bonded to the mirror portion.

3. The variable-shape mirror of claim 1,
wherein the fixed portions are bonded to the mirror portion at an edge thereof.

4. The variable-shape mirror of claim 1,
wherein the piezoelectric elements are arranged outside an area within which the mirror surface is irradiated with the light beam.

5. The variable-shape mirror of claim 2,
wherein the piezoelectric elements are arranged outside an area within which the mirror surface is irradiated with the light beam.

6. The variable-shape mirror of claim 3,
wherein the piezoelectric elements are arranged outside an area within which the mirror surface is irradiated with the light beam.

7. The variable-shape mirror of claim 1,
wherein the piezoelectric elements are located close to the fixed portions individually.

8. The variable-shape mirror of claim 2,
wherein the piezoelectric elements are located close to the fixed portions individually.

9. The variable-shape mirror of claim 3,
wherein the piezoelectric elements are located close to the fixed portions individually.

10. The variable-shape mirror of claim 4,
wherein the piezoelectric elements are located close to the fixed portions individually.

11. The variable-shape mirror of claim 5,
wherein the piezoelectric elements are located close to the fixed portions individually.

12. The variable-shape mirror of claim 6,
wherein the piezoelectric elements are located close to the fixed portions individually.

13. The variable-shape mirror of claim 1,
wherein individual pairs of the piezoelectric elements and the fixed portions are arranged symmetrically in cross-shaped directions in plain view of the variable-shape mirror.

14. The variable-shape mirror of claim 2,
wherein individual pairs of the piezoelectric elements and the fixed portions are arranged symmetrically in cross-shaped directions in plain view of the variable-shape mirror.

15. The variable-shape mirror of claim 3,
wherein individual pairs of the piezoelectric elements and the fixed portions are arranged symmetrically in cross-shaped directions in plain view of the variable-shape mirror.

16. The variable-shape mirror of claim 4,
wherein individual pairs of the piezoelectric elements and the fixed portions are arranged symmetrically in cross-shaped directions in plain view of the variable-shape mirror.

17. The variable-shape mirror of claim 7,
wherein individual pairs of the piezoelectric elements and the fixed portions are arranged symmetrically in cross-shaped directions in plain view of the variable-shape mirror.

18. A variable-shape mirror comprising:

a support base;

a mirror portion that is disposed to face the support base and that has, on a side thereof facing away from the support base, a mirror surface which is irradiated with a light beam;

piezoelectric elements that are sandwiched between and within the support base and the mirror portion so as to make contact with both of the support base and the mirror portion, that vary a shape of the mirror surface, and that are disposed independently from each other; and fixed portions that make contact with the support base, that are bonded to the mirror portions, that are sandwiched between and within the support base and the mirror portion, that are provided in a same number as the piezoelectric elements, and that are disposed independently from each other, wherein the fixed portions are bonded to the mirror portion in outer peripheral parts of the mirror portion, and wherein the piezoelectric elements by making individual pairs with the respective fixed portions that are disposed closest thereto are arranged symmetrically outside an area within which the mirror surface is irradiated with a light beam, and the piezoelectric elements are arranged closer to a center of the mirror portion than the fixed portions with which said individual pairs are made are.

19. An optical pickup device comprising the variable-shape mirror of claim 1.

* * * * *